United States Patent
Cox et al.

(10) Patent No.: US 6,419,839 B1
(45) Date of Patent: Jul. 16, 2002

(54) POOL AND SPA FILTER MEDIA

(75) Inventors: Stephen T. Cox, Radford, VA (US); Dino E. Abelli, Cumberland, RI (US)

(73) Assignee: Hollingsworth & Vose Company, East Walpole, MA (US)

(*) Notice: Subject to any disclaimer, the term of this patent is extended or adjusted under 35 U.S.C. 154(b) by 0 days.

(21) Appl. No.: 09/639,053

(22) Filed: Aug. 15, 2000

(51) Int. Cl.$^7$ ................................................ B01D 37/00
(52) U.S. Cl. ................. 210/764; 210/169; 210/416.2; 210/435; 210/501; 210/505; 210/508
(58) Field of Search .................. 210/764, 169, 210/416.2, 435, 501, 503, 505, 508

(56) References Cited

U.S. PATENT DOCUMENTS

| | | | |
|---|---|---|---|
| 4,108,775 A | | 8/1978 | Wilkes et al. ............... 210/169 |
| 5,093,967 A | * | 3/1992 | Frank |
| 5,486,410 A | * | 1/1996 | Groeger et al. |
| 5,597,645 A | * | 1/1997 | Pike et al. |
| 5,607,766 A | | 3/1997 | Berger |
| 5,645,057 A | * | 7/1997 | Watt et al. |
| 5,709,735 A | * | 1/1998 | Midkiff et al. |
| 5,804,128 A | | 9/1998 | Ogata et al. |
| 5,868,933 A | | 2/1999 | Patrick et al. ............... 210/484 |
| 5,906,743 A | * | 5/1999 | Cohen et al. |
| 5,935,518 A | | 8/1999 | Richard et al. ............... 422/28 |
| 6,090,469 A | * | 7/2000 | Wadsworth et al. |
| 6,156,086 A | * | 12/2000 | Zhang |

FOREIGN PATENT DOCUMENTS

| | | |
|---|---|---|
| JP | 53 128 072 | 11/1978 |
| JP | 01 274 814 | 11/1989 |
| JP | 01 315 387 | 12/1989 |
| JP | 03 080 907 | 4/1991 |
| JP | 10 216 430 | 8/1998 |

* cited by examiner

*Primary Examiner*—Betsey Morrison Hoey
(74) *Attorney, Agent, or Firm*—Nutter & McClennen & Fish LLP

(57) ABSTRACT

A carded nonwoven filter media comprising one or more layers of core-sheath fibers wherein the sheath portion of a fiber is bonded to one or more adjacent core fibers is disclosed. In a preferred embodiment, the nonwoven filter media includes an antimicrobial fiber component.

23 Claims, 1 Drawing Sheet

POOL AND SPA FILTER MEDIA

BACKGROUND OF THE INVENTION

Swimming, soaking in a spa, whirlpool, hot tub or hydrotherapy pool, can promote an individual's health and relieve physical and psychological stresses. Swimming pools, hot tubs, spas, hydrotherapy pools and the like, referred to collectively as "pools", must be kept clean in terms of water quality. The elimination of dirt, debris, hair, oils, and microorganisms from the pool water is critical towards ensuring the health and safety of the individual bathing in the pool. This can be particularly true with indoor pools which are generally heated and are supposed to be used in all seasons. Sweat, hair and other foreign matter originating from the human body are potential sources of bacterial growth that can contaminate the pool water and deteriorate its quality.

To eliminate contaminants, pool water has traditionally been treated by continuous passage of a portion of the water from the pool over filters containing sand or over filters containing diatomaceous earth, after a first passage through a filter for the removal of materials such as, particulates, dirt, debris, insects, hair, oils, etc. The water is then returned to the pool with, optionally, the addition of a chemical product such as chlorine, chlorine dioxide, bromine, iodine, ozone or the like, in order to disinfect it.

Sand and diatomaceous earth are typically the filtration media of choice, but are not the only filtration media currently available. Substitutes for sand and/or diatomaceous earth include ceramic filters and activated carbon. For example, porous ceramic filters have a three-dimensional network of extremely fine filtering spaces that can trap organic matter, such as oils. However, these ceramic filters can become easily clogged with the build-up of oils, dirt and biofilm formed by microorganisms associated with the flora of a typical pool environment.

More importantly, the first filter often used for the filtration of pool water is often found as a filtration cartridge mounted in combination with a water suction and delivery system. The coarsely filtered water can then be filtered through a secondary system, if present, as described above. The filter cartridges are generally made of a pleated polyester fabric arranged radially along the generating lines of a central cylinder. The base of the cartridge is placed in communication with the suction system in order to filter the water that enters from the outside of the cartridge and passes across its walls. Although the polyester fabric filter removes contaminants, it gets dirty quite quickly from the build up of oils, microorganisms and biofilm, and it is often difficult to clean due to its fragile construction. Consequently, cleansing of the filter can be problematic, not easily lending itself to decontamination and removal of microorganisms. Cleaning of the filter can lead to tearing of the polyester, degradation of the porosity of the material and/or further embedding the debris into the polyester fabric.

Therefore, a need exists which overcomes one or more of the above identified problems.

SUMMARY OF THE INVENTION

The present invention circumvents one or more of the problems described above by providing a nonwoven or carded nonwoven, e.g., a composite, which retains particles, oils, eliminates bacteria, and withstands pool environments without the release of the antibacterial, if present in the composite, into the pool water. The present invention also pertains to methods of use of the nonwoven or carded nonwoven filter media as pool filters or in filter cartridges and also kits which include the filter media.

The filter media of the invention is inexpensive and readily manufactured. Additionally, the fibrous materials used for the filter media are commercially available, thereby providing flexibility in the processing of various grades of the filter media, e.g., basis weight, thickness, etc.

In one aspect, the invention pertains to nonwoven filter media which include one or more layers of core-sheath fibers. Preferably, the nonwoven filter media is carded. The sheath portion of a fiber is bonded to one or more adjacent core fibers, forming an interconnected three-dimensional array of core fibers interspersed and connected by the sheath material. The sheath material connects the core fibers together, such that the nonwoven filter media, e.g., carded nonwoven media, is porous. This bonding is generally accomplished by melting the sheath material about the core fiber. At points of contact, the melted sheath material solidifies upon cooling, thereby forming the interconnected three-dimensional porous filter media.

In another aspect, the invention pertains to antimicrobial nonwoven filter media, that includes an antimicrobial fiber and a second fiber, wherein the antimicrobial fiber and second fiber are entangled together. In a preferred embodiment, the second fiber is a core-sheath fiber which forms an interconnected three-dimensional array of core fibers and antimicrobial fibers interspersed and connected by the sheath material. The sheath material connects the core fibers and antimicrobial fibers together, such that the nonwoven filter media is porous. In a preferred embodiment, the antimicrobial fibers and second fibers, e.g., core-sheath fibers, are carded. This results in a carded nonwoven filter material.

The filter media of the invention advantageously has excellent physical characteristics, such as stiffness, which allows for ease in pleatability. As a consequence, the filter media readily lends itself to manufacturing procedures which require that the media be pleated every inch, returning, for example, at 180 degree angles without loss in mechanical strength or integrity. This physical and mechanical qualities of the present filter media provide that an increased number of pleats can be used in the construction of a filter cartridge. The increase in the number of pleats is directly proportional to increased surface area of a filter cartridge. Therefore, the surface area provided by the filter media of the invention allows for increased filtration efficiency of oils, dirt, debris, microorganisms (and their biofilm) and the like from water, air, or body fluids.

The filter media of the invention can advantageously be used for filtration of public water supplies, home tap water, and, preferably, pools. In a preferred embodiment, the filter media of the invention are used in pools for the removal of oils, dirt, debris and microorganisms. The filter media can be configured in a filter cartridge or other configurations known in the art that are readily adapted to the final application. In some instances, layers of sheets of the filter media of the invention, stacked on one another, is a suitable method for the clarification/purification of water.

The filter media composites of the present invention can be used in a variety of filtration applications beyond water purification. The filter media of the invention can also advantageously be used for the filtration of air to remove air-borne particulates and/or microorganisms. Among the uses for such filter media are industrial face masks, ASHRAE filters, HEPA filters, e.g., HEPA vacuum filter bags, and ULPA filters.

Other advantages of the invention will be readily apparent to one having ordinary skill in the art upon reading the following description.

All percentages by weight identified herein are based on the total weight of the nonwoven layer unless otherwise indicated.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
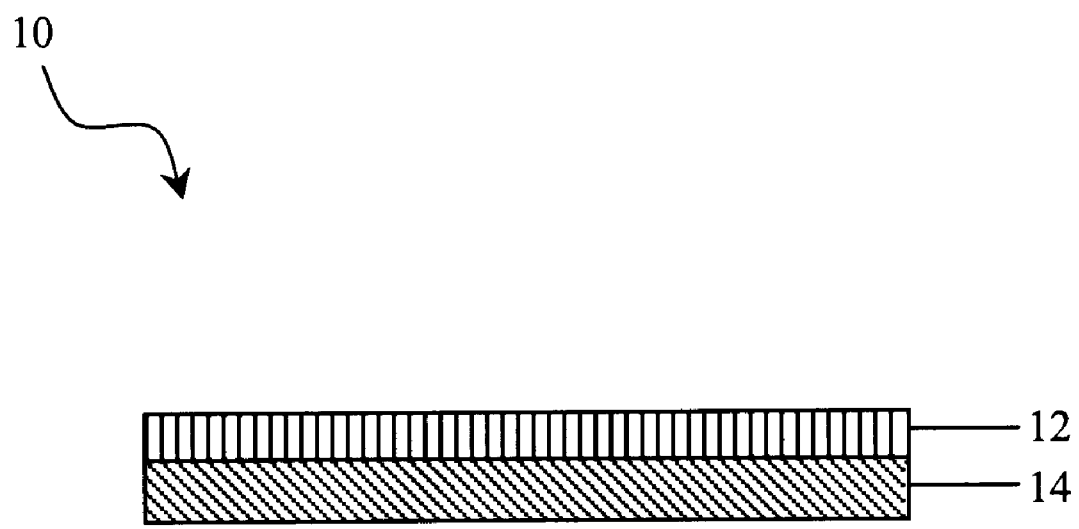
FIG. 1 is a diagram illustrating one embodiment of a filter media according to the present invention.

The features and other details of the invention will now be more particularly described and pointed out in the claims. It will be understood that the particular embodiments of the invention are shown by way of illustration and not as limitations of the invention. The principle features of this invention can be employed in various embodiments without departing from the scope of the invention.

The present invention is based, at least in part, on a discovery that the present invention provides filtration media suitable for use in various applications where removal of dirt, debris, oils and microorganisms, e.g., bacteria, from water or air is required. The invention is also related to methods of removal of these contaminants from water or air. For example, the filter media of the present invention can be used in industrial face masks, ASHRAE filters, HEPA filters, e.g., HEPA vacuum filter bags, and ULPA filters. Alternatively, the filter media provided by the present invention can be used to purify/clarify water. In certain aspects, the water source can be a public water supply or home tap water. Preferably, the water to be treated is associated with a pool, as defined infra, for the removal of oils, dirt, debris and microorganisms. The filter media can be configured in a filter cartridge or other configurations known in the art that are readily adapted to the final application. In some instances, layers of sheets of the filter media of the invention, stacked on one another, is a suitable method for the clarification/purification of the water.

The term "pool" as used herein, is intended to include swimming pools of various sizes, wading pools, spas, hot tubs, Jacuzzi® and the like. The term "pools" as used herein includes not only ordinary swimming pools but also whirlpools installed in sports clubs, Kurhaus (spa houses) and healthcare facilities, as well as various kinds of health promoting hot tubs and spas. For example, a spa can be considered a small pool used for bathing or hydrotherapy in which water is heated and circulated. A typical spa has a volume of less than about 1,500 gallons. The spa can include hydrotherapy jet circulation, hot water/cold water mineral baths, air induction bubbles, or combinations thereof. Other common terminology for spas includes hydrotherapy pools, therapeutic pools, whirlpools, hot spas, hydrotherapy spas, or hot tubs.

Generally, the water in the pool is not drained, cleaned or refilled for each individual bather. Thus, it often is desirable to have a reliable water purification system for the pool. The water in a pool can be purified, for example, by adding chlorine to kill microorganisms that thrive in the warm water. The pool water is typically filtered as it is circulated. Typically, the water is "prefiltered" by a coarse filter prior to entry into the purification system (usually sand or diatomaceous earth filters). These coarse filters can be polymeric or metallic screens which trap dirt and debris from the water before it enters the purification system.

More specifically, where the pool is a hot tub or the like, the prefilter is the sole filter and is used to removed debris, insects, oils, bacteria and biofilm from the water. Generally, most hot tubs and the like do not have a secondary water purification system. Therefore, these filters or cartridges perform the task of filtering the pool water and need to be cleaned on a regular basis.

Prefilters constructed with polymeric materials such as REEMAYO® 2040 or REEMAY® 2033, a polyethylene terephthalate, (BBA Nonwovens Reemay, Inc. P.O. Box 511, Old Hickory, Tenn. 37138) have been used to remove debris, however, such prefilters have relatively poor stiffness, and can result in poor pleating characteristics. As a consequence, these filters often times do not provide adequate surface area for the filtration of water from the pool prior to entry into the purification system. Additionally, the filter often becomes "clogged" with microorganisms and/or biofilm, thus decreasing the throughput of water through the filter. As a consequence, these filters require constant cleaning to remove biofilm buildup from the living and dead microorganisms.

The present invention provides filter media with improved physical and mechanical characteristics over filters currently available. The construction of the filter media of the invention provides for machine direction stiffness values, measured in milligrams, greater than 230 milligrams. In certain embodiments, the filter media of the invention have a stiffness value of greater than 500 milligrams, e.g., from about 500 milligrams to about 1500 milligrams, preferably from about 230 milligrams to about 530 milligrams, and most preferably from about 300 milligrams to about 500 milligrams.

The stiffness of the filter media allows for ease in pleatability. As a consequence, the filter media of the invention readily lends itself to various manufacturing procedures. Often times, filter media be must be pleated every inch. That is, the media must withstand a 40 to 180 degree bend throughout every inch of the medial without loss in mechanical strength or integrity. The physical and mechanical qualities of the present filter media provide for an increased number of pleats per unit area which is useful in the construction of a filter cartridge. The increased number of pleats relates directly to an increased surface area of a filter cartridge. Therefore, the surface area provided by the filter media of the invention allows for increased filtration capacity for the removal of oils, dirt, debris, microorganisms (and their biofilm) and the like from water, air, or body fluids.

Stiffness values of the filter media of the present invention are measured by those methods known to artisans skilled in the art, such as by ASTM D5732 IST 90.2.

A typical basis weight of the filter media of the invention ranges from about 30 to about 400 g/m$^2$, preferably from about 80 to about 200 g/m$^2$, and most preferably from about 100 to about 150 g/m$^2$. The filter media generally have a thickness range from about 0.1 to about 2.54 millimeters, preferably from about 0.18 to about 1.3 millimeters, and most preferably from about 0.2 to about 0.74 millimeters. Air permeability of the filtration media is generally from about 20 to about 300 cubic feet per minute per square foot (cfm/ft$^2$), preferably from about 70 to about 190 cfm/ft$^2$, and most preferably from about 100 to about 140 cfm/ft$^2$. Tensile strength and percent elongation are also important parameters useful in the construction of filter cartridges made from the filter media of the invention. Typical tensile strengths (machine direction) of the filter media are from about 5 to about 60 pounds per in (lbs/in), preferably from about 17 to about 45 lbs/in, and most preferably from about 25 to about 35 lbs/in. Elongation percentage of the filter media is generally from about 5 to about 50, preferably from about 16 to about 32 and most preferably from about 20 to about 27.

Air permeability measurements of the filter media of the present invention are measured by those methods known to artisans skilled in the art, such as by ASTM D737, Air Permeability of Textile Fabrics.

Tensile strength measurements of the filter media of the present invention are measured by those methods known to artisans skilled in the art, such as by ASTM D1682, Breaking Load and Elongation of Textile Fabrics.

In one aspect, the present invention provides nonwoven filter media useful in the removal of particles, dirt, debris, and/or microorganisms from air or water, and in particular, pool water. The nonwoven filter media includes one or more layers of core-sheath fibers wherein the sheath portion of a fiber is bonded to one or more adjacent core fibers. In one embodiment, the nonwoven fiber media has one or more of the preferred physical or mechanical characteristics described above. In a preferred embodiment, the nonwoven fiber media has one or more of the preferred characteristics and is "carded".

The term "core-sheath" is art recognized and refers to fibers containing at least two different component polymers that are arranged to occupy distinct sections across the cross-section of each of the fibers along the entire or substantially entire length of the fiber. Core-sheath fibers generally contain at least two component polymers having different melting points, and the lowest melting component polymer forms at least a portion of the peripheral surface of each of the filaments. The component polymers are generally selected to have a melting point difference between the highest melting component polymer and the lowest melting component polymer of at least about 5° C., more preferably at least about 10° C., most preferably at least about 30° C., such that the lowest melting polymer can be melted or rendered tacky without melting the higher melting component polymers of the filaments. This difference in melting points is advantageously used to bond the fibers to each other via the softened/melted sheath component(s). When a nonwoven web containing the core-sheath fibers is heated to a temperature equal to or higher than the melting point of the lowest melting component polymer but below the melting point of the highest melting component polymer, the melted peripheral portions of the filaments form interfiber bonds, especially at the cross-over contact points, throughout the web while the high melting polymer portions of the filaments maintain the physical and dimensional integrity of the web.

The sheath portion of a fiber is bonded to one or more adjacent core fibers, forming an interconnected three-dimensional array of core fibers interspersed and connected by the sheath material. The sheath material connects the core fibers together, such that the carded nonwoven filter media is porous. This bonding is generally accomplished by melting the sheath material about the core fiber. At points of contact, the melted sheath material solidifies upon cooling, thereby forming the interconnected three-dimensional porous filter media.

The nonwoven web formed from the core-sheath fibers is bonded using any effective bonding means that heats the web to a temperature sufficiently high enough to melt the lowest melting component polymer but below the melting point of the higher melting structural component polymers of the web, thereby causing the filaments to form interfiber bonds, especially at cross-over contact points, throughout the web. For example, a through-air bonding, oven bonding, or infrared bonding process that effects interfiber bonds without applying significant compacting pressure can be used. Particularly useful is a through-air bonding process which effects interfiber bonds by thoroughly and evenly heating the web with a penetrating flow of forced, heated air.

For example, the core-sheath fibers, alone or in combination with additional melt blown, spun bond or antimicrobial fibers described herein, can be treated with a "through air bonder", often times referred to as a Fleissner. Carded or noncarded nonwoven webs pass over the through air bonder, or Fleissner as is known in the art, which typically include a two drum unit, each under vacuum. As the web passes over the drums, the web is heated to a temperature which causes the sheath to soften and/or melt, and a suction is applied. The speed, temperature and suction of the drums can be controlled to effect the degree of softening or melting of the sheath material of the core-sheath fiber such that the melted sheath material is substantially homogenous throughout the nonwoven. After passage over the drum(s), the web can then be calendered as is known in the art.

In a preferred embodiment, shown in FIG. 1, core-sheath fibers 12 and antimicrobial fibers 14 are combined and formed into a nonwoven web 10, e.g., a carded nonwoven web, as described above and passed over a through air bonder system to cause the sheath material of the core-sheath fibers to melt throughout the nonwoven web. Typically, the core-sheath fiber percentage is in a range from about 1 to about 99 percent by weight, preferably from about 50 to about 80 percent and the antimicrobial fiber percentage is in a range from about 99 to about 1 percent by weight, preferably from about 50 to about 20 percent, where the total weight of the resultant web is based on the combined amounts of each fiber. Generally, the ratio of core-sheath fiber percentage to antimicrobial fiber is sufficient such that the melted sheath material of the core-sheath fiber can contact one of more adjoining antimicrobial fibers to form a three-dimensional network as described above. This ratio can be determined by one skilled in the art dependent upon the fiber length, diameter, and degree of melting required for the particular application.

Optionally, the blended fibers can be carded prior to deposition onto a collection belt. The web of fibers is then passed through a thermal bonding unit, as described above, such as a Fleissner through-air bonder. Optionally, the resultant web can be post-calendered and slit into the appropriate size as necessary. The line speed of the collection device can be varied, dependent upon the fibers present, and generally is from about 1 to about 100 yards/minute, preferably from about 5 to about 10 yards/minute, e.g., 8 yards/minute, with a bonding temperature (Fleissner) of about 204° C. with a vacuum of approximately 60% and a calendering temperature of 120° C.

The phrase "substantially homogenous" is intended to mean that the sheath material of a core-sheath fiber has been melted sufficiently throughout a nonwoven material, such that there is essentially no gradient across the cross section of the nonwoven web. This can be controlled by the speed at which the nonwoven web passes over, for example, a Fleissner, the temperature, and the vacuum.

The core-sheath fibers are produced from a wide variety of thermoplastic polymers that are known to form fibers. As indicated above, the core-sheath fibers contain at least two component polymers having different melting points.

Examples of suitable polyolefins include polyethylene, e.g., high density polyethylene, low density polyethylene and linear low density polyethylene; polypropylene, e.g., isotactic polypropylene, syndiotactic polypropylene, and blends of isotactic polypropylene and atactic polypropylene; polybutene, e.g., poly(1-butene) and poly(2-butene); polypentene, e.g., poly(l-pentene), poly(2-pentene), poly(3-methyl-1-pentene) and poly(4-methyl-1-pentene); copolymers thereof, e.g., ethylene-propylene copolymers; and blends thereof. Polymers suitable for the second component of the fiber include polyolefins; polyamides, e.g., nylon 6, nylon 6/6, nylon 10, nylon 12 and the like; polyesters, e.g., polyethylene terephthalate, polybutylene terephthalate and the like; polycarbonates; polystyrenes; thermoplastic elastomers, e.g., ethylene-propylene rubbers, styrenic block copolymers, copolyester elastomers and polyamide elastomers and the like; fluoropolymers, e.g., polytetrafluoroethylene and polytrifluorochloroethylene; vinyl polymers, e.g., polyvinyl chloride; polyurethanes; and blends and copolymers thereof.

Particularly useful core-sheath fiber pairs include polyolefin-polyamide, e.g., polyethylene-nylon 6, polyethylene-nylon 6/6, polypropylene-nylon 6, polypropylene-nylon 6/6, polyethylene-a copolymer of nylon 6 and nylon 6/6, and polypropylene-a copolymer of nylon 6 and nylon 6/6; polyolefin-polyester, e.g., polyethylene-polyethylene terephthalate, polypropylene-polyethylene terephthalate, polyethylene-polybutylene terephthalate and polypropylene-polybutylene terephthalate; and polyolefin-polyolefin, e.g., polyethylene-polypropylene and polyethylene-polybutylene.

The terms "carded" or "carded nonwoven" are recognized in the art and are intended to mean polymeric nonwoven webs which can be produced by a process wherein voluminous masses of polymeric fibers are separated by opposed moving beds of closely spaced needles into individual fibers, aligned for the most part in the machine direction and formed into a coherent web. The resultant fiber web is aligned in the same direction as the needles are used to comb the individual fibers.

The carded nonwoven webs of the invention include the various types fibers described herein, including core-sheath fibers and/or melt blown fibers and/or antimicrobial fibers, having lengths from about 1.5 to about 15 cm, preferably from about 2 to about 7 cm, and most preferably from about 2.5 to about 5 cm. The denier of these fibers is in the range of from about 1 to about 30, preferably from about 1 to about 20, more preferably from about 2 to about 10, and most preferably from about 3 to about 5 denier. The fibers are supplied to a carding line in the form of bales or bundles which are opened mechanically by pickers equipped with sharp teeth or needles to tear the tightly compacted fibers apart by a process called picking. The fibers are transferred mechanically on belts or by chutes to form fiber batts, called picker laps, which are processed by carding.

The carding process can be performed by a revolving flat, stationary flat or workerstripper process. For example, in the revolving flat carding process, a carding machine utilizes opposed moving beds of closely spaced needles to pull and tease the fibers apart. At the center of the carding machine is a large, rotating cylinder covered with a card comprised of needles, wires, or fine metallic teeth embedded in a heavy cloth or metal foundation. Opposing moving beds of needles are wrapped on the large cylinder and a large number of narrow flats are held on an endless belt moving over the top of the cylinder. The needles of the two opposing surfaces are inclined in opposite directions and move at different speeds with the main cylinder moving faster than the flats.

As a result of the process, the clumps of fibers between the two beds of needles are separated into individual fibers which are aligned in the machine direction as each fiber is held by individual needles from the two beds. The fibers engage each other randomly and form a coherent web at and below the surfaces of the needles. Other mechanical means remove or doff the web from the cylinder. The doffed web is deposited onto a moving belt where it can be combined with other webs. Carded webs can be 3.5 m wide or wider and can be produced at speeds of 140 m/min or faster. Nonwoven webs made from webs from conventional cards have high machine direction and low cross-machine direction tensile strengths. Low cross-machine tensile strength can be solved by cross-laying an oriented web at or near a 45° angle to another oriented web on the moving belt.

The term "meltblown fibers" as used herein indicates fibers formed by extruding a molten thermoplastic polymer through a plurality of fine, usually circular, die capillaries as molten threads or filaments into a high velocity gas stream which attenuate the filaments of molten thermoplastic polymer to reduce their diameter. As is known in the art, the flow rate and pressure of the attenuating gas stream can be adjusted to form continuous meltblown filaments or discontinuous fibers. The formed air-borne fibers, which are not fully quenched, are carried by the high velocity gas stream and deposited on a collecting surface to form a web of randomly dispersed and autogenously bonded meltblown fibers. An exemplary process for producing meltblown fiber web is disclosed in U.S. Pat. No. 3,849,241 to Butin et al. In general meltblown fibers have an average fiber diameter of up to about 10 micrometers.

Meltblown materials fall in the general class of textiles referred to as nonwovens as they comprise randomly oriented fibers made by entangling the fibers through mechanical means. The fiber entanglement, with or without some interfiber fusion, imparts integrity and strength to the fabric. The nonwoven fabric may be converted to a variety of end use products as mentioned above, e.g., pool filters.

The term "spunbond fibers" as used herein indicates small diameter filaments that are formed by extruding one or more molten thermoplastic polymers as fibers from a plurality of capillaries of a spinneret. The extruded fibers are cooled while being drawn by an eductive or other well-known drawing mechanism to form spunbond fibers. The drawn spunbond fibers are then deposited or laid onto a forming surface in a random manner to form a loosely entangled and uniform fiber web. The laid fiber web is then subjected to a bonding process, such as thermobonding or by needlepunching, to impart physical integrity and dimensional stability. Typically, spunbond fibers have an average diameter of at least about 10 microns. Exemplary processes for producing spunbond nonwoven webs are disclosed, for example, in U.S. Pat. Nos. 4,340,563 to Appel et al., 3,802,817 to Matsuki et al., 3,855,046 to Hansen et al. and 3,692,618 to Dorschner et al. Spunbonded webs are characterized by a relatively high strength/weight ratio, high porosity, have abrasion resistance properties and are typically non-uniform in such properties as basis weight and coverage.

Spunbonded polymeric nonwoven webs can be produced by extruding polymer through a die to form a multiplicity of continuous thermoplastic polymer strands as the polymer exits holes in the die in a generally downward direction onto a moving surface where the extruded strands are collected in a randomly distributed fashion. The randomly distributed strands are subsequently bonded together by to provide sufficient integrity in a resulting nonwoven web of continuous fibers.

Suitable polymers useful in nonwoven, e.g., carded nonwoven, media of the present invention include various core-sheath polymers described above as well as various polymer resins, including but not limited to, polyolefins such as polyethylene, preferably, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene.

The term "denier" is recognized in the art and relates to a measurement of a fiber. The measurement is defined as a fiber's weight in grams for every 9000 meters in length. For example, a denier (dpf) of 3 is equivalent to 3 grams of weight for 9000 meters of length, a dpf of 1 is equivalent to 1 gram of weight for 9000 meters, etc.

The term "biofilm" is recognized in the art and is intended to include microorganisms as well as the substances excreted by such microorganisms which form a layer of material on surfaces. Typically, a biofilm is a conglomerate of microbial organisms, e.g., microorganisms such as bacteria, embedded in a highly hydrated matrix of exopolymers, typically polysaccharides, and other macromolecules. Biofilms may contain either single or multiple microbial species and readily adhere to the surfaces of pools and pool filters. As a result, the biofilm can cause fouling, e.g., plugging, of the filter thus decreasing filtering efficiency of the filter.

Attaching to and colonizing on a surface in an aqueous environment, microorganisms such as bacteria, are generally thought to form the biofilm and modify the surface to favor the development of the more complex community of organisms that make up advanced biofouling of the aqueous system and its submerged surfaces.

Biofouling, or biological fouling, is a persistent nuisance or problem in a wide varieties of aqueous systems. Biofouling, is caused by the buildup of microorganisms, extracellular substances, and dirt and debris that become trapped in the biomass. The organisms involved include microorganisms such as bacteria, fungi, yeasts, algae, diatoms, protozoa, and macro organisms such as macro algae.

The filter media of the invention are useful for the removal of microorganisms by capturing the microorganisms. In one embodiment, the filter is positioned prior to entry of the water into a secondary purification system. In a preferred embodiment, the filter is the sole water purification device. The microorganisms and/or the biofilm adhere to the surface of the filter media. In preferred embodiments, the filter media includes an antimicrobial fiber such that the microorganisms and/or the biofilm are killed, thereby eliminating such contaminants from pool water or air. Therefore, the filter media of the invention serve to treat the pool water or air to remove such contaminants. The use of antimicrobial fibers in the filter media helps to prevent buildup of the biofilm on the surface of the filter from airborne or solubilized contaminants. Subsequently, biofouling is either prevented or lessened, cleaning of the filter is minimized, and, for example, the pool water is purified.

Antimicrobial fibers useful in the present invention can be prepared from polypropylene, polypropylene, cellulose acetate, rayon, lyocell, acrylic, polyester or any other fibrous material that will support an antimicrobial agent. The fiber is typically impregnated with an antimicrobial agent for example, during its spinning and formation. Preferably, the antimicrobial agent which is used is mixed with the polymer base resin during formation of the fibers so that it is dispersed throughout the fibers and will diffuse to the surface of the fibers during use of the filter cartridge. The deniers of these fibers can be between 0.3 dpf to 10 dpf, the preferable range based on cost and performance being 1.5 dpf to 6 dpf. These fibers typically are rendered antimicrobial, either by treating them topically or by impregnating them with the antimicrobial agent during their extrusion. The concentration of the antimicrobial agent in the fibers generally is between 100 to 10,000 ppm, preferably between 2000 ppm to 8000 ppm.

A suitable antimicrobial fiber useful in the invention, for example, is available from Sterling (Sterling Fibers Inc., 5005 Sterling Way, Pace, Fla. 32571; Sterling V60SB Biofresh (includes Microban® as the antimicrobial), 3 denier/filament, 50 millimeters in length). Other manufacturers of suitable antimicrobial fibers include, for example, Asota Fibers, Barnet (Barnet, P.O. Box 131, 1300 Hayne Street, Arcadia, S.C. 29420) and Wellman (Wellman, Inc., P.O. Box 31331, Charlotte, N.C. 28231).

In a preferred embodiment, the antimicrobial agent is practically insoluble in the water passing through and over the filter media, and is safe, non-toxic, non-carcinogenic, non-sensitizing to end users such as humans. Generally, the antimicrobial is a broad spectrum antimicrobial agent, i.e., it is equally effective against the majority of harmful bacteria encountered in water. For example, an antimicrobial agent such as 2,4,4'-trichloro-2'-hydroxy diphenol ether, or 5-chloro-2-phenol (2,4 dichlorophenoxy) commonly sold under the trademark MICROBAN, by Microban Products Co. (Microban Products Company, 11515 Vanstory Drive, Suite 110, Huntersville, N.C. 28078) generally is used. However, it will be understood that various other antimicrobial agents can be used in the present invention.

Generally, the antimicrobial fibers, if present in the filter media, constitute from about 1 to about 99 weight percent of the nonwoven medial. For example, the antimicrobial fibers can constitute a portion of the filter media from about 20 to about 80 percent by weight, preferably, the percentage of the antimicrobial fibers is in the range from about 30 to about 60 percent, more preferably from about 35 to about 55 percent and most preferably about 40 percent by weight. The antimicrobial fibers can be integrally entangled and bonded within and throughout the nonwoven filter media by the melting of core-sheath fibers about the antimicrobial fibers, as described above, or by treatment with a latex emulsion of binder resin, e.g., an aqueous binder resin.

In one embodiment, melt blown or spunbond fibers described above, are mixed with an antimicrobial fiber and treated with a binding resin. The binding resin is an aqueous emulsion or suspension of latex binder, such as, acrylates and vinyl acetates. In general, the fibers which can be carded or noncarded, are formed into a nonwoven web which is then treated with the latex binder by dipping, spraying, or saturating the web with the binder. The web is subsequently dried, and optionally, calendered to form the final filter media which includes the antimicrobial fiber, the meltblown or spunbond fibers, and the binder resin.

Generally, the range of binder resin used to prepare the filter media is from about 8 to about 50 percent, preferably from about 14 to about 28 percent and most preferably from about 18 to about 22 percent based on the solids content of the suspension or emulsion. Typically the percentage of binder used in a filter media prepared by this process is from about 1 to about 80 percent, preferably from about 20 to about 60 percent and most preferably from about 35 to about 40 percent based on the weight of the nonwoven media.

For example, a blend of meltblown fibers and an antimicrobial fiber is prepared and laid on a collection belt. The resultant web is then saturated with an aqueous binder solution. Typically, the binder solution consists of an acrylic or vinyl acetate polymer at approximately 20% solids. A 40% (by dry weight) increase is generally targeted for the resultant nonwoven web. After saturation, the web is passed over several dryer cans (approximately 110° C.) to drive water from the web. Typically the line speed is in the range of about four (4) to about one hundred (100) yard/minute, preferably about 20 to about 65 yards/minute. After the web is dried, collection and slitting of the media can be performed as required.

The following examples serve to further describe the invention.

EXAMPLE 1

The amount of fiber(s) (antimicrobial and/or binder fiber) are blended according to the desired percentage(s) and intimately mixed. The fibers are then carded into a web. The web is passed through a Fehrer, a series of rollers that comb the web with assistance from high velocity air that results in a web of highly randomized fiber orientation. This oriented web is delivered via conveyor to a Fleissner through-air bonder where the sheath of the core-sheath fiber is melted and intimately mixed within the entire web structure. Upon exiting of the Fleissner, the product is calendered with steel-on-steels rolls. The web is then collected, optionally slit, and wound onto a final roll. The line speed for the process was approximately 8 yards/minute. The Fleissner had a temperature of about 204° C. with a vacuum of about 60%. The calendering temperature was approximately 120° C. See Table 1 for physical properties of filtration media produced by the above-described process.

TABLE 1

| Physical Property | TR2847A | TR2847C | Reemay 2040 | Reemay 2033 |
|---|---|---|---|---|
| Basis Weight (g/m$^2$) | 132.3 | 143.5 | 134.3 | 98.7 |
| Thickness (C&R) (mils) | 20.2 | 19.5 | 22.1 | 17.2 |
| Thickness (TMI) (mils) | 17.5 | 16.6 | 20.9 | 15.9 |
| Air Permeability (cfm/ft$^2$) | 118.1 | 133.5 | 170 | 227.1 |
| Tensile (MD) (lbs/in) | 26.1 | 33.7 | 38.4 | 25.2 |
| Elongation (MD) (%) | 23.6 | 25.5 | 50.8 | 45 |
| Stiffness (milligrams) | 233.6 | 527.2 | 110 | |
| Composition (fiber/%) | Polyester Binder Fiber* 60% Antimicrobial Fiber** 40% | Polyester Binder Fiber* 100% | Polyester | Polyester |

*The particular binder fiber used was Kosa Type 252, 3 denier/filament; 1.75 inches in length. (Kosa, 15710 JFK Blv., Houston, Texas, 77032)
**The particular antimicrobial fiber used was Sterling V60SB Biofresh, 3 denier/filament; 50 millimeters in length.

The particular binder fiber used was Kosa Type 252, 3 denier/filament; 1.75 inches in length. (Kosa, 15710 JFK Blv., Houston, Tex., 77032)

The particular antimicrobial fiber used was Sterling V60SB Biofresh, 3 denier/filament; 50 millimeters in length.

Those having ordinary skill in the art will know, or be able to ascertain, using no more than routine experimentation, many equivalents to the specific embodiments of the invention described herein. These and all other equivalents are intended to be encompassed by the following claims. All publications and references cited herein, including those in the background section, are expressly incorporated herein by reference in their entirety.

What is claimed is:

1. An antimicrobial nonwoven filter media, comprising an antimicrobial fiber, a second fiber and a binder, wherein the antimicrobial fiber and second fiber are entangled together.

2. The antimicrobial nonwoven filter media of claim 1, wherein the antimicrobial fiber contains 5-chloro-2-phenol as the antimicrobial agent.

3. The antimicrobial nonwoven filter media of claim 1 wherein the antimicrobial fiber is present in the nonwoven in a range of about 20 to about 80 percent by total weight of the nonwoven.

4. The antimicrobial nonwoven filter media of claim 1, wherein the antimicrobial fiber is present in the nonwoven in a range of about 20 to about 50 percent by total weight of the nonwoven.

5. The antimicrobial nonwoven filter media of claim 1, wherein the nonwoven filter media has a stiffness of greater than 500 milligrams.

6. The antimicrobial nonwoven filter media of claim 1, wherein the nonwoven filter media has a stiffness from about 500 milligrams to about 1500 milligrams.

7. The antimicrobial nonwoven filter media of claim 1, wherein the nonwoven filter media has a stiffness from about 230 milligrams to about 530 milligrams.

8. The antimicrobial nonwoven filter media of claim 1, wherein the second fiber is a core-sheath fiber and the sheath portion of the core-sheath fiber serves as the binder and is bonded to one or more adjacent core fibers.

9. The antimicrobial nonwoven filter media of claim 8, wherein the bonding of the sheath material is substantially homogenous throughout the nonwoven filter media.

10. The antimicrobial nonwoven filter media of claim 1, wherein the binder is an acrylic or a vinyl acetate binder.

11. An antibacterial carded nonwoven filter media, comprising an antimicrobial fiber and a second fiber, wherein the second fiber is a core-sheath fiber and the sheath portion of the core-sheath fiber is bonded to one or more adjacent core fibers.

12. The antimicrobial carded nonwoven filter media of claim 11, wherein the antimicrobial fiber is present in the nonwoven in a range of about 20 to about 80 percent by total weight of the nonwoven.

13. The antimicrobial carded nonwoven filter media of claim 11, wherein the antimicrobial fiber is present in the nonwoven in a range of about 20 to about 50 percent by total weight of the nonwoven.

14. The antimicrobial carded nonwoven filter media of claim 11, wherein the core-sheath fibers have a denier measurement of about 1 to about 5.

15. The antimicrobial carded nonwoven filter media of claim 11, wherein the core-sheath fibers have a denier measurement of at least 3.

16. The antimicrobial carded nonwoven filter media of claim 11, wherein the core-sheath fibers have a length of from about 1 to about 3 inches.

17. The antimicrobial carded nonwoven filter media of claim 11, wherein the bonding of the sheath material is substantially homogenous throughout the nonwoven filter media.

18. A method for treating pool water, comprising the step of filtering pool water through carded nonwoven filter media comprising one or more layers of core-sheath fibers wherein the sheath portion of a fiber is bonded to one or more adjacent core fibers.

19. A method for treating pool water, comprising the step of filtering pool water through antimicrobial nonwoven filter media, comprising an antimicrobial fiber, a second fiber and a binder, wherein the antimicrobial fiber and second fiber are entangled together.

20. A method for treating pool water, comprising the step of filtering pool water through antibacterial carded nonwoven filter media, comprising an antimicrobial fiber and a second fiber, wherein the second fiber is a core-sheath fiber and the sheath portion of the core-sheath fiber is bonded to one or more adjacent core fibers.

21. A pool filtration kit, comprising a pool filter cartridge constructed of carded nonwoven filter media comprising one or more layers of core-sheath fibers wherein the sheath portion of a fiber is bonded to one or more adjacent core fibers and instructions for use.

22. A pool filtration kit, comprising a pool filter cartridge constructed of antimicrobial nonwoven filter media, comprising an antimicrobial fiber, a second fiber and a binder, wherein the antimicrobial fiber and second fiber are entangled together and instructions for use.

23. A pool filtration kit, comprising a pool filter cartridge constructed of antibacterial carded nonwoven filter media, comprising an antimicrobial fiber and a second fiber, wherein the second fiber is a core-sheath fiber and the sheath portion of the core-sheath fiber is bonded to one or more adjacent core fibers and instructions for use.

* * * * *